United States Patent
Kuo et al.

(10) Patent No.: US 8,076,867 B2
(45) Date of Patent: Dec. 13, 2011

(54) DRIVING CIRCUIT WITH CONTINUOUS DIMMING FUNCTION FOR DRIVING LIGHT SOURCES

(75) Inventors: Ching-Chuan Kuo, Taipei (TW); Yung-Lin Lin, Palo Alto, CA (US)

(73) Assignee: O2Micro, Inc., Santa Clara, CA (US)

( * ) Notice: Subject to any disclaimer, the term of this patent is extended or adjusted under 35 U.S.C. 154(b) by 204 days.

(21) Appl. No.: 12/415,028

(22) Filed: Mar. 31, 2009

(65) Prior Publication Data

US 2010/0148681 A1    Jun. 17, 2010

Related U.S. Application Data

(63) Continuation-in-part of application No. 12/316,480, filed on Dec. 12, 2008.

(51) Int. Cl.
*H05B 37/02* (2006.01)

(52) U.S. Cl. .......... 315/291; 315/307

(58) Field of Classification Search ....... 315/185 R, 315/224, 225, 244, 245, 287, 291, 307, 312, 315/314
See application file for complete search history.

(56) References Cited

U.S. PATENT DOCUMENTS

| | | | |
|---|---|---|---|
| 5,691,605 A | 11/1997 | Xia et al. | |
| 6,839,247 B1 | 1/2005 | Yang et al. | |
| 7,190,124 B2 | 3/2007 | Kumar et al. | |
| 7,312,783 B2 | 12/2007 | Oyama | |
| 7,759,881 B1 * | 7/2010 | Melanson | 315/307 |
| 7,800,315 B2 | 9/2010 | Shteynberg et al. | |
| 7,804,256 B2 * | 9/2010 | Melanson | 315/291 |
| 7,852,017 B1 | 12/2010 | Melanson | |
| 2004/0085030 A1 * | 5/2004 | Laflamme et al. | 315/291 |
| 2007/0182347 A1 * | 8/2007 | Shteynberg et al. | 315/312 |
| 2008/0203946 A1 * | 8/2008 | Ito et al. | 315/307 |
| 2008/0258647 A1 | 10/2008 | Scianna | |
| 2009/0167187 A1 | 7/2009 | Kitagawa et al. | |
| 2009/0184662 A1 | 7/2009 | Given et al. | |
| 2009/0295303 A1 | 12/2009 | Pucko et al. | |
| 2009/0322254 A1 | 12/2009 | Lin | |
| 2009/0322255 A1 | 12/2009 | Lin | |

FOREIGN PATENT DOCUMENTS

| | | |
|---|---|---|
| CN | 1760721 A | 4/2006 |
| CN | 101176386 A | 5/2008 |
| CN | 101472368 A | 7/2009 |
| EP | 2026634 A1 | 2/2009 |

* cited by examiner

*Primary Examiner* — Jacob Y Choi
*Assistant Examiner* — Jimmy Vu

(57) ABSTRACT

A driving circuit for controlling power of a light source includes a power converter coupled to a power source and the light source, and a dimming controller coupled to the power converter. The power converter can receive power from the power source and provide a regulated power to the light source. The power converter includes a control switch coupled in series with the light source. The dimming controller can monitor a power switch coupled between the power source and the driving circuit, and receive a dimming request signal and a dimming termination signal. The dimming request signal can indicate a first set of operations of the power switch. The dimming termination signal can indicate a second set of operations of the power switch. The dimming controller can continuously adjust the regulated power from the power converter by controlling the control switch if the dimming request signal is received, and can stop adjusting the regulated power from the power converter if the dimming termination signal is received.

18 Claims, 13 Drawing Sheets

DRIVING CIRCUIT WITH CONTINUOUS DIMMING FUNCTION FOR DRIVING LIGHT SOURCES

RELATED APPLICATIONS

This application is a continuation-in-part of the co-pending U.S. application Ser. No. 12/316,480, titled "Driving Circuit with Dimming Controller for Driving Light Sources", filed on Dec. 12, 2008, which is hereby incorporated by reference in its entirety.

BACKGROUND

In recent years, light sources such as light emitting diodes (LEDs) have been improved through technological advances in material and manufacturing processes. LED possesses relatively high efficiency, long life, vivid colors and can be used in a variety of industries including the automotive, computer, telecom, military and consumer goods, etc. One example is an LED lamp which uses LEDs to replace traditional light sources such as electrical filament.

FIG. 1 shows a schematic diagram of a conventional LED driving circuit 100. The LED driving circuit 100 utilizes an LED string 106 as a light source. The LED string 106 includes a group of LEDs connected in series. A power converter 102 converts an input voltage Vin to a desired output DC voltage Vout for powering the LED string 106. A switch 104 coupled to the power converter 102 can enable or disable the input voltage Vin to the LED string 106, and therefore can turn on or turn off the LED lamp. The power converter 102 receives a feedback signal from a current sensing resistor Rsen and adjusts the output voltage Vout to make the LED string 106 generate a desired light output. One of the drawbacks of this solution is that a desired light output is predetermined. In operation, the light output of the LED string 106 is set to a predetermined level and may not be adjusted by users.

FIG. 2 illustrates a schematic diagram of another conventional LED driving circuit 200. A power converter 102 converts an input voltage Vin to a desired output DC voltage Vout for powering the LED string 106. A switch 104 coupled to the power converter 102 can enable or disable the input voltage Vin to the LED string 106, and therefore can turn on or turn off the LED lamp. The LED string 106 is coupled to a linear LED current regulator 208. Operational amplifiers 210 in the linear LED current regulator 208 compares a reference signal REF and a current monitoring signal from current sensing resistor Rsen, and generates a control signal to adjust the resistance of transistor Q1 in a linear mode. Therefore, the LED current flowing through the LED string 106 can be adjusted accordingly. In this solution, in order to control the light output of the LED string 106, users may need to use a dedicated apparatus, such as a specially designed switch with adjusting buttons or a switch that can receive a remote control signal, to adjust the reference signal REF.

SUMMARY

A driving circuit for controlling power of a light source includes a power converter coupled to a power source and the light source, and a dimming controller coupled to the power converter. The power converter can receive power from the power source and provide a regulated power to the light source. The power converter includes a control switch coupled in series with the light source. The dimming controller can monitor a power switch coupled between the power source and the driving circuit, and receive a dimming request signal and a dimming termination signal. The dimming request signal can indicate a first set of operations of the power switch. The dimming termination signal can indicate a second set of operations of the power switch. The dimming controller can continuously adjust the regulated power from the power converter by controlling the control switch if the dimming request signal is received, and can stop adjusting the regulated power from the power converter if the dimming termination signal is received.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Figure 1:
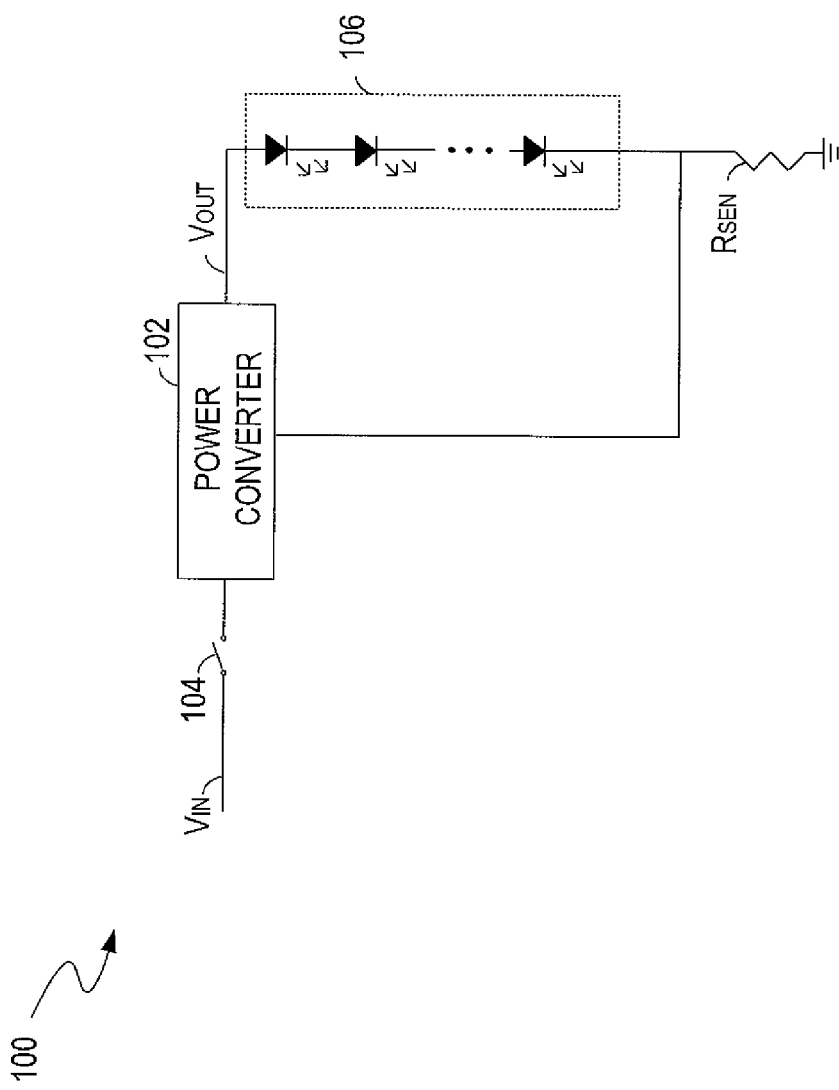
FIG. 1 shows a schematic diagram of a conventional LED driving circuit.
Figure 2:
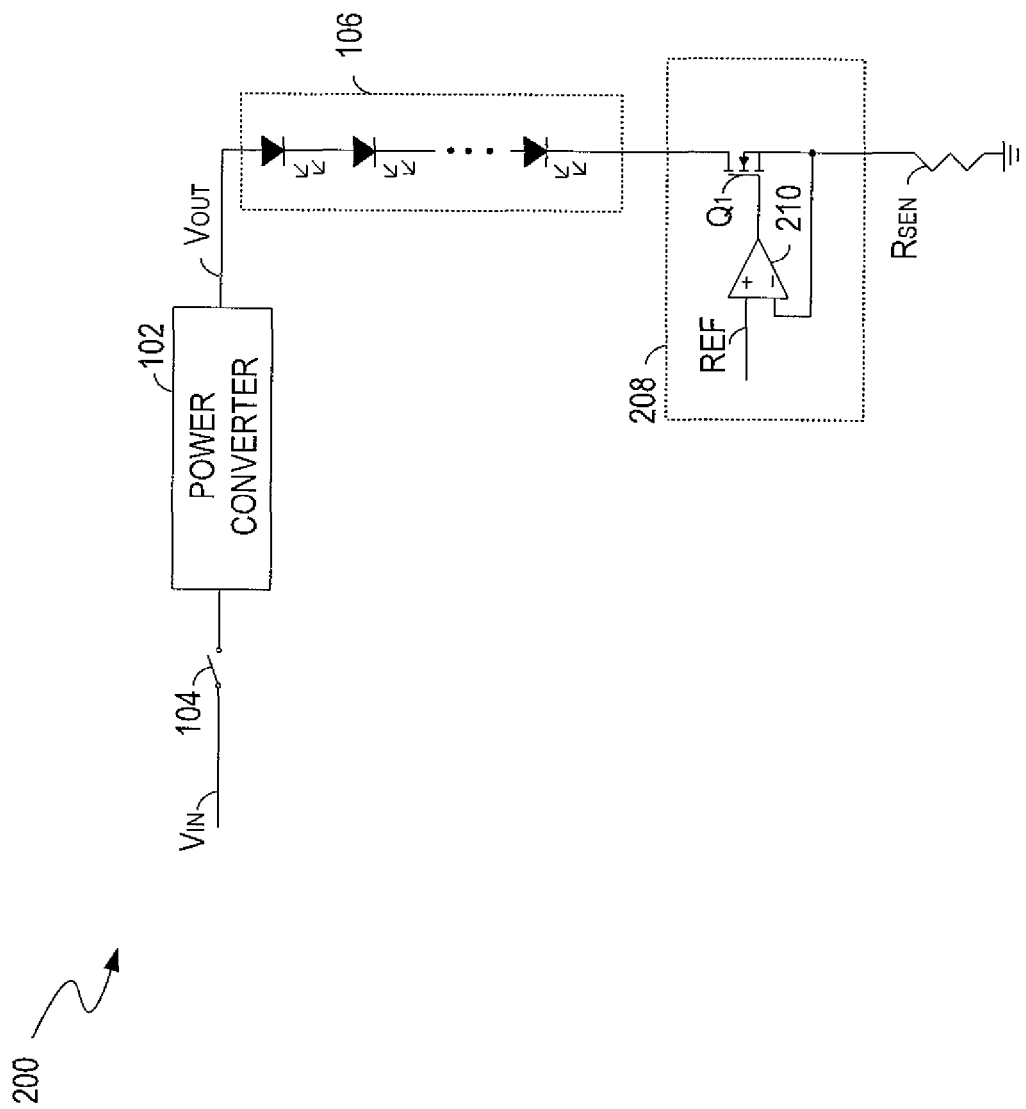
FIG. 2 shows a schematic diagram of another conventional LED driving circuit.
Figure 3:
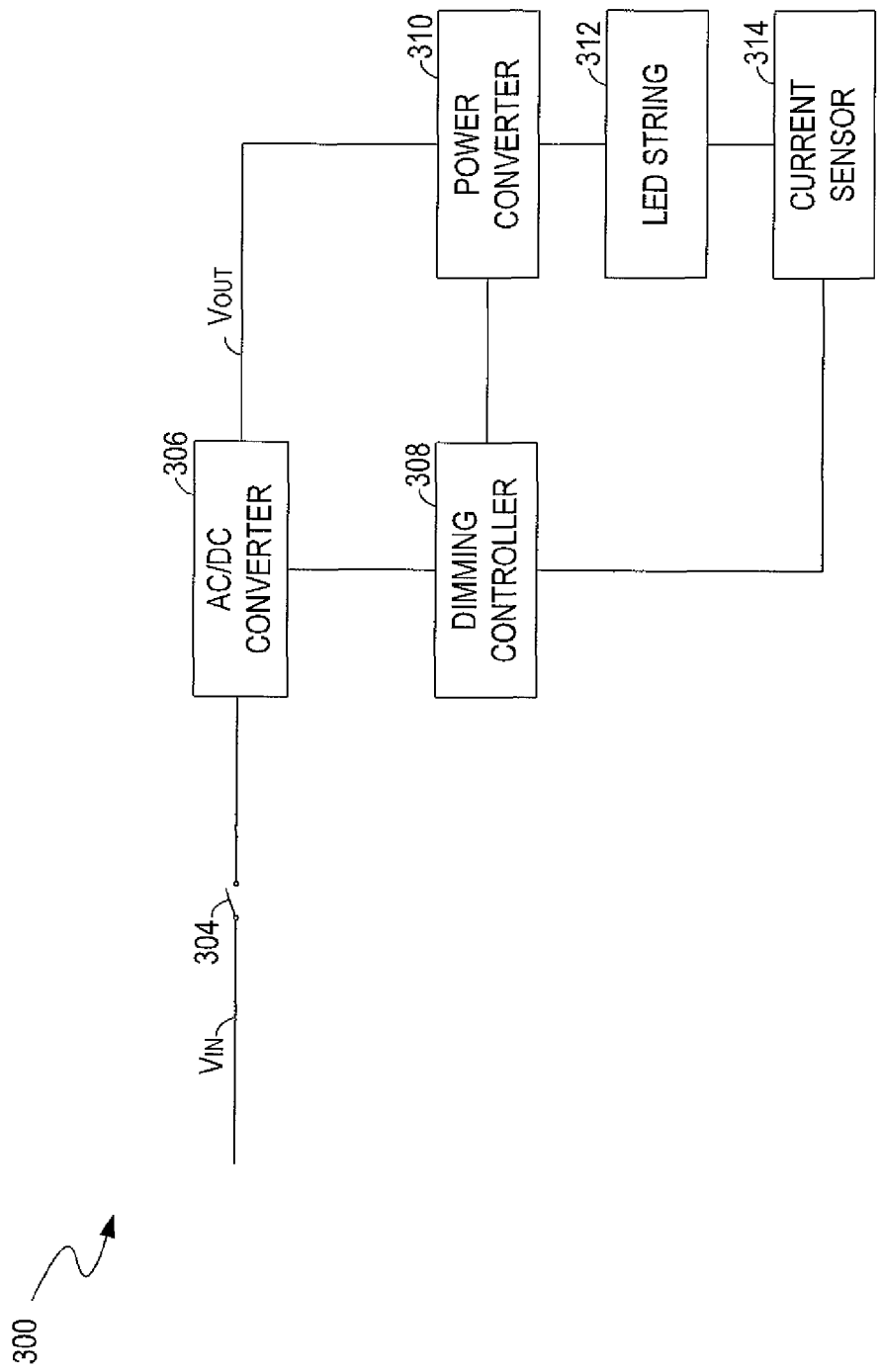
FIG. 3 shows a block diagram of a light source driving circuit, in accordance with one embodiment of the present invention.

FIG. 3 shows an example of a block diagram of a light source driving circuit 300, in accordance with one embodiment of the present invention. In one embodiment, the light source driving circuit 300 includes an AC/DC converter 306 for converting an AC input voltage Vin from a power source to a DC voltage Vout, a power switch 304 coupled between the power source and the AC/DC converter 306 for selectively coupling the power source to the light source driving circuit 300, a power converter 310 coupled to the AC/DC converter 306 for providing an LED string 312 with a regulated power, a dimming controller 308 coupled to the power converter 310 for receiving a switch monitoring signal indicative of an operation of the power switch 304 and for adjusting the regulated power from the power converter 310 according to the switch monitoring signal, and a current sensor 314 for sensing an LED current flowing through the LED string 312. In one embodiment, the power switch 304 can be an on/off switch mounted on the wall.

In operation, the AC/DC converter 306 converts the input AC voltage Vin to the output DC voltage Vout. The power converter 310 receives the DC voltage Vout and provides the LED string 312 with a regulated power. The current sensor 314 generates a current monitoring signal indicating a level of an LED current flowing through the LED string 312. The dimming controller 308 monitors the operation of the power switch 304, receives the current monitoring signal from the current sensor 314, and is operable for controlling the power converter 310 to adjust power of the LED string 312 in response to the operation of the power switch 304. In one embodiment, the dimming controller 308 operates in an analog dimming mode and adjusts the power of the LED string 312 by adjusting a reference signal indicating a peak value of the LED current. In another embodiment, the dimming controller 308 operates in a burst dimming mode and adjusts the power of the LED string 312 by adjusting a duty cycle of a pulse width modulation (PWM) signal. By adjusting the power of the LED string 312, the light output of the LED string 312 can be adjusted accordingly.

Figure 4:
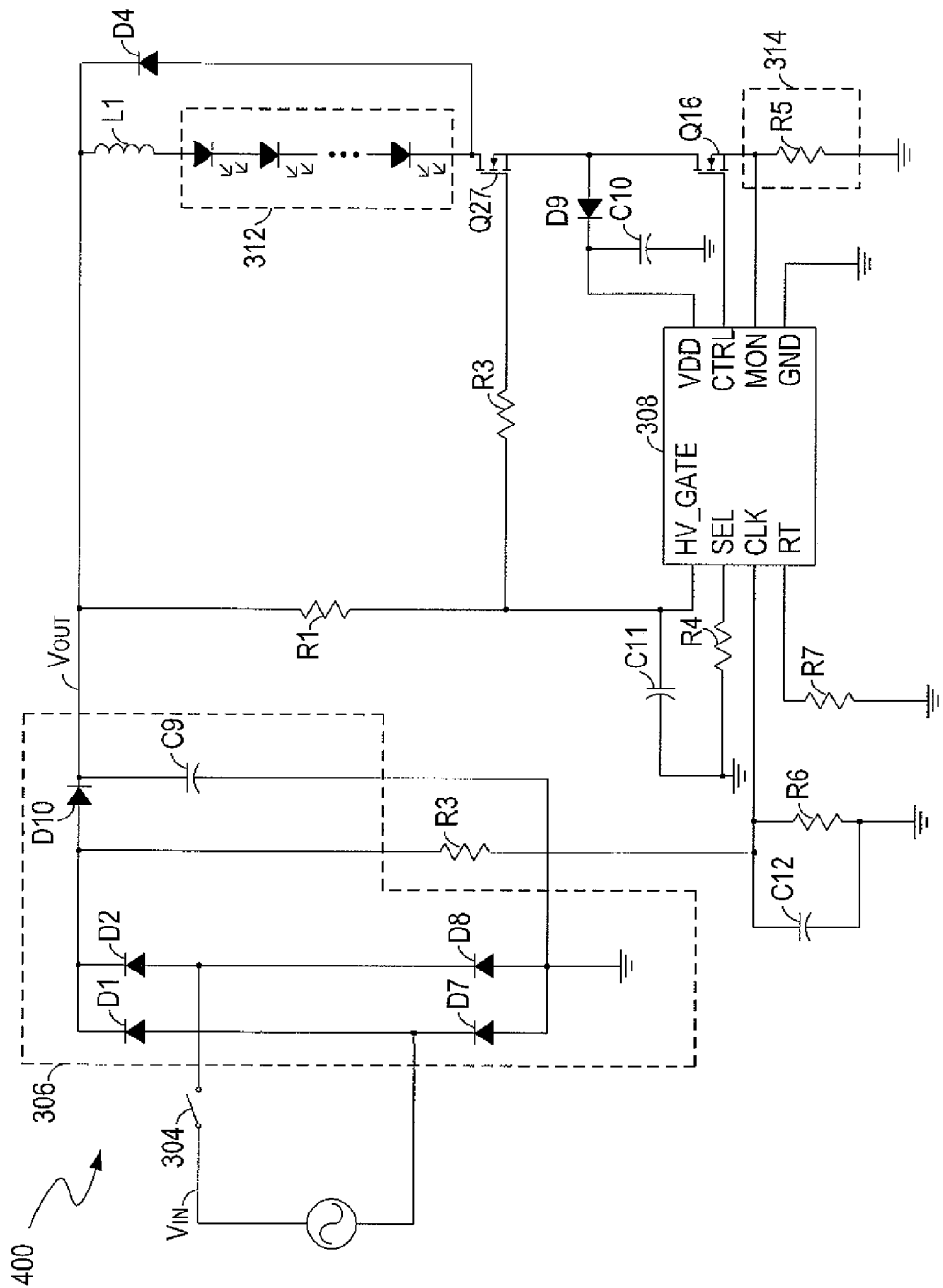
FIG. 4 shows a schematic diagram of a light source driving circuit, in accordance with one embodiment of the present invention.

FIG. 4 shows an example of a schematic diagram of a light source driving circuit 400, in accordance with one embodiment of the present invention. FIG. 4 is described in combination with FIG. 3. Elements labeled the same as in FIG. 3 have similar functions and will not be detailed described herein.

The light source driving circuit 400 includes a power converter 310 (shown in FIG. 3) coupled to a power source and coupled to an LED string 312 for receiving power from the power source and for providing a regulated power to the LED string 312. In the example of FIG. 4, the power converter 310 can be a buck converter including an inductor L1, a diode D4 and a control switch Q16. In the embodiment shown in FIG. 4, the control switch Q16 is implemented outside the dimming controller 308. In another embodiment, the control switch Q16 can be integrated in the dimming controller 308.

A dimming controller 308 is operable for receiving a switch monitoring signal indicative of an operation of a power switch, e.g., a power switch 304 coupled between the power source and the light source driving circuit, and for adjusting the regulated power from the power converter 310 (including the inductor L1, the diode D4 and the control switch Q16) by controlling the control switch Q16 coupled in series with the LED string 312 according to the switch monitoring signal. The light source driving circuit 400 can further include an AC/DC converter 306 for converting an AC input voltage Vin to a DC output voltage Vout, and a current sensor 314 for sensing an LED current flowing through the LED string 312. In the example of FIG. 4, the AC/DC converter 306 can be a bridge rectifier including diodes D1, D2, D7, D8, D10, and a capacitor C9. The current sensor 314 can include a current sensing resistor R5.

In one embodiment, terminals of the dimming controller 308 can include HV_GATE, SEL, CLK, RT, VDD, CTRL, MON and GND. The terminal HV_GATE is coupled to a switch Q27 through a resistor R3 for controlling a conductance status, e.g., ON/OFF status, of the switch Q27 coupled to the LED string 312. A capacitor C11 is coupled between the terminal HV_GATE and ground for regulating a gate voltage of the switch Q27.

A user can select a dimming mode, e.g., an analog dimming mode or a burst dimming mode, by coupling the terminal SEL to ground through a resistor R4 (as shown in FIG. 4), or coupling the terminal SEL to ground directly.

The terminal CLK is coupled to the AC/DC converter 306 through a resistor R3, and is coupled to ground through a resistor R6. The terminal CLK can receive a switch monitoring signal indicating an operation of the power switch 304. In one embodiment, the switch monitoring signal can be generated at a common node between the resistor R3 and the resistor R6. A capacitor C12 is coupled to the resistor R6 in parallel for filtering undesired noises. The terminal RT is coupled to ground through a resistor R7 for determining a frequency of a pulse signal generated by the dimming controller 308.

The terminal VDD is coupled to the switch Q27 through a diode D9 for supplying power to the dimming controller 308. In one embodiment, an energy storage unit, e.g., a capacitor C10, coupled between the terminal VDD and ground can power the dimming controller 308 when the power switch 304 is turned off. In an alternate embodiment, the energy storage unit can be integrated in the dimming controller 308. The terminal GND is coupled to ground.

The terminal CTRL is coupled to the control switch Q16. The control switch Q16 is coupled in series with the LED string 312 and the switch Q27, and is coupled to ground through the current sensing resistor R5. The dimming controller 308 is operable for adjusting the regulated power from the power converter 310 by controlling a conductance status, e.g., ON and OFF status, of the control switch Q16 using a control signal via the terminal CTRL. The terminal MON is coupled to the current sensing resistor R5 for receiving a current monitoring signal indicating an LED current flowing through the LED string 312. When the switch Q27 is turned on, the dimming controller 308 can adjust the LED current flowing through the LED string 312 to ground by controlling the control switch Q16.

In operation, when the power switch 304 is turned on, the AC/DC converter 306 converts an input AC voltage Vin to a DC voltage Vout. A predetermined voltage at the terminal HV_GATE is supplied to the switch Q27 through the resistor R3 so that the switch Q27 is turned on.

If the dimming controller 308 turns on the control switch Q16, the DC voltage Vout powers the LED string 312 and charges the inductor L1. An LED current flows through the inductor L1, the LED string 312, the switch Q27, the control switch Q16, the current sensing resistor R5 to ground. If the dimming controller 308 turns off the control switch Q16, an LED current flows through the inductor L1, the LED string 312 and the diode D4. The inductor L1 is discharged to power the LED string 312. As such, the dimming controller 308 can adjust the regulated power from the power converter 310 by controlling the control switch Q16.

When the power switch 304 is turned off, the capacitor C10 is discharged to power the dimming controller 308. A voltage across the resistor R6 drops to zero, therefore a switch monitoring signal indicating a turn-off operation of the power switch 304 can be detected by the dimming controller 308 through the terminal CLK. Similarly, when the power switch 304 is turned on, the voltage across the resistor R6 rises to a predetermined voltage, therefore a switch monitoring signal indicating a turn-on operation of the power switch 304 can be detected by the dimming controller 308 through the terminal CLK. If a turn-off operation is detected, the dimming controller 308 can turn off the switch Q27 by pulling the voltage at the terminal HV_GATE to zero such that the LED string 312 can be turned off after the inductor L1 completes discharging. In response to the turn-off operation, the dimming controller 308 can adjust a reference signal indicating a target light output of the LED string 312. Therefore, when the power switch 304 is turned on next time, the LED string 312 can generate a light output according to the adjusted target light output. In other words, the light output of the LED string 312 can be adjusted by the dimming controller 308 in response to the turn-off operation of the power switch 304.

Figure 5:
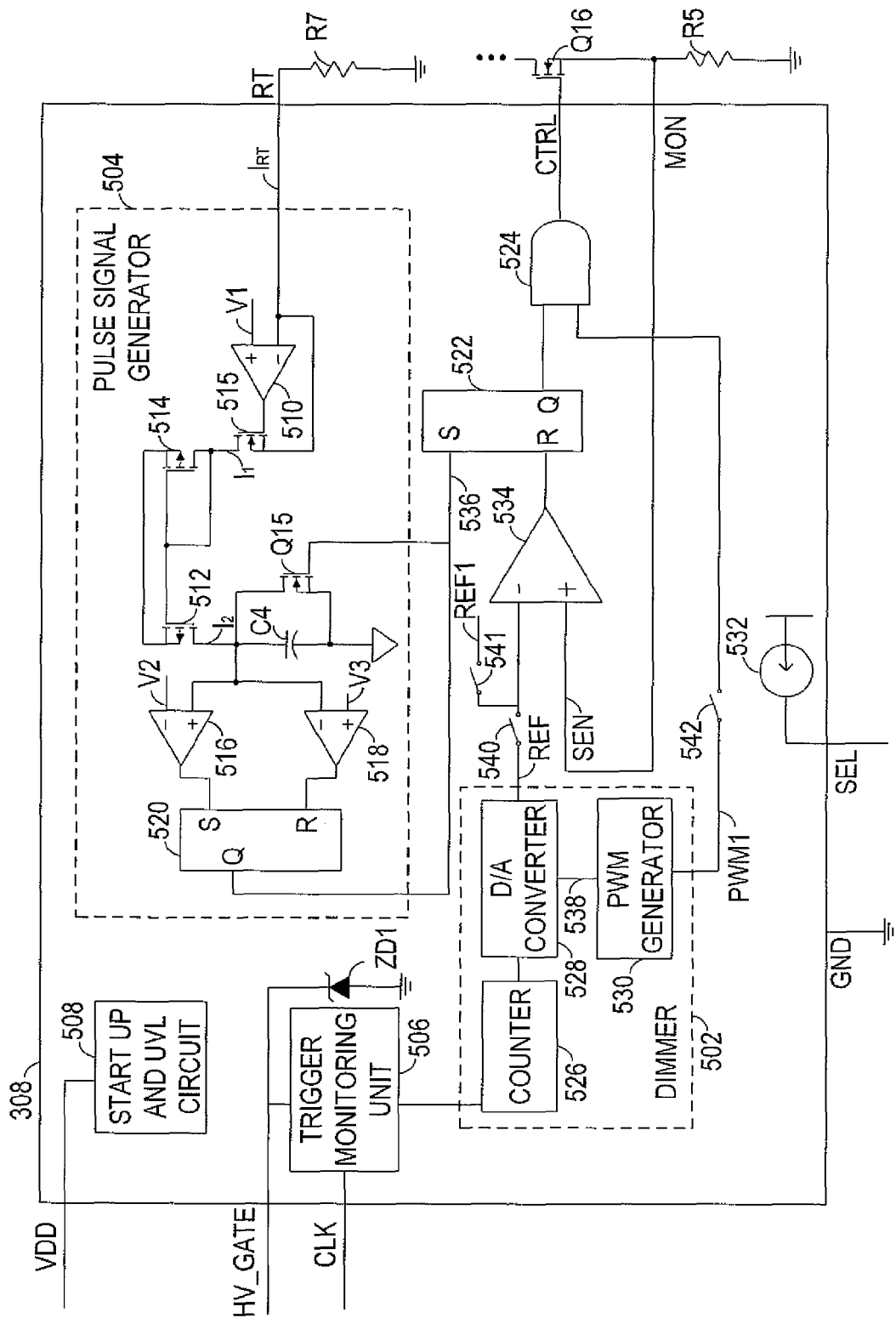
FIG. 5 shows a structure of a dimming controller in FIG. 4, in accordance with one embodiment of the present invention.

FIG. 5 shows an example of a structure of the dimming controller 308 in FIG. 4, in accordance with one embodiment of the present invention. FIG. 5 is described in combination with FIG. 4. Elements labeled the same as in FIG. 4 have similar functions and will not be detailed described herein.

The dimming controller 308 includes a trigger monitoring unit 506, a dimmer 502 and a pulse signal generator 504. The trigger monitoring unit 506 is coupled to ground through a Zener diode ZD1. The trigger monitoring unit 506 can receive a switch monitoring signal indicating an operation of the external power switch 304 through the terminal CLK and can generate a driving signal for driving a counter 526 when an operation of the external power switch 304 is detected at the terminal CLK. The trigger monitoring unit 506 is further operable for controlling a conductance status of the switch Q27. The dimmer 502 is operable for generating a reference signal REF to adjust power of the LED string 312 in an analog dimming mode, or generating a control signal 538 for adjusting a duty cycle of a PWM signal PWM1 to adjust the power of the LED string 312. The pulse signal generator 504 is operable for generating a pulse signal which can turn on a control switch Q16. The dimming controller 308 can further include a start up and under voltage lockout (UVL) circuit 508 coupled to the terminal VDD for selectively turning on one or more components of the dimming controller 308 according to different power condition.

In one embodiment, the start up and under voltage lockout circuit 508 is operable for turning on all the components of the dimming controller 308 when the voltage at the terminal VDD is greater than a first predetermined voltage. When the power switch 304 is turned off, the start up and under voltage lockout circuit 508 is operable for turning off other components of the dimming controller 308 except the trigger monitoring unit 506 and the dimmer 502 when the voltage at the terminal VDD is less than a second predetermined voltage, in order to save energy. The start up and under voltage lockout circuit 508 is further operable for turning off the trigger monitoring unit 506 and the dimmer 502 when the voltage at the terminal VDD is less than a third predetermined voltage. In one embodiment, the first predetermined voltage is greater than the second predetermined voltage and the second predetermined voltage is greater than the third predetermined voltage. Because the dimming controller 308 can be powered by the capacitor C10 through the terminal VDD, the trigger monitoring unit 506 and the dimmer 502 can still operate for a time period after the power switch 304 is turned off.

In the dimming controller 308, the terminal SEL is coupled to a current source 532. Users can choose a dimming mode by configuring the terminal SEL, e.g., by coupling the terminal SEL directly to ground or coupling the terminal SEL to ground via a resistor. In one embodiment, the dimming mode can be determined by measuring a voltage at the terminal SEL. If the terminal SEL is directly coupled to ground, the voltage at the terminal SEL is approximately equal to zero. A control circuit can in turn switch on a switch 540, switch off a switch 541 and switch off a switch 542. Therefore, the dimming controller 308 can work in an analog dimming mode and can adjust the power of the LED string 312 (shown in FIG. 4) by adjusting a reference signal REF. In one embodiment, if the terminal SEL is coupled to ground via a resistor R4 having a predetermined resistance (as shown in FIG. 4), the voltage at the terminal SEL can be greater than zero. The control circuit can in turn switch off the switch 540, switch on the switch 541 and switch on the switch 542. Therefore, the dimming controller 308 can work in a burst dimming mode and can adjust the power of the LED string 312 (shown in FIG. 4) by adjusting a duty cycle of a PWM signal PWM1. In other words, different dimming modes can be selected by controlling the ON/OFF status of the switch 540, switch 541 and switch 542. The ON/OFF status of the switch 540, switch 541 and switch 542 can be determined by the voltage at the terminal SEL.

The pulse signal generator 504 is coupled to ground through the terminal RT and the resistor R7 for generating a pulse signal 536 which can turn on the control switch Q16. The pulse signal generator 504 can have different configurations and is not limited to the configuration as shown in the example of FIG. 5.

In the pulse signal generator 504, the non-inverting input of an operational amplifier 510 receives a predetermined voltage V1. Thus, the voltage of the inverting input of the operational amplifier 510 can be forced to V1. A current IRT flows through the terminal RT and the resistor R7 to ground. A current I1 flowing through a MOSFET 514 and a MOSFET 515 is equal to IRT. Because the MOSFET 514 and a MOSFET 512 constitute a current mirror, a current I2 flowing through the MOSFET 512 is also substantially equal to IRT. The output of a comparator 516 and the output of a comparator 518 are respectively coupled to the S input and the R input of an SR flip-flop 520. The inverting input of the comparator 516 receives a predetermined voltage V2. The non-inverting input of the comparator 518 receives a predetermined voltage V3. V2 is greater than V3, and V3 is greater than zero, in one embodiment. A capacitor C4 is coupled between the MOSFET 512 and ground, and has one end coupled to a common node between the non-inverting input of the comparator 516 and the inverting input of the comparator 518. The Q output of the SR flip-flop 520 is coupled to the switch Q15 and the S input of an SR flip-flop 522. The switch Q15 is coupled in parallel with the capacitor C4. A conductance status, e.g., ON/OFF status, of the switch Q15 can be determined by the Q output of the SR flip-flop 520.

Initially, the voltage across the capacitor C4 is approximately equal to zero which is less than V3. Therefore, the R input of the SR flip-flop 520 receives a digital 1 from the output of the comparator 518. The Q output of the SR flip-flop 520 is set to digital 0, which turns off the switch Q15. When the switch Q15 is turned off, the voltage across the capacitor C4 increases as the capacitor C4 is charged by I2. When the voltage across C4 is greater than V2, the S input of the SR flip-flop 520 receives a digital 1 from the output of the comparator 516. The Q output of the SR flip-flop 520 is set to digital 1, which turns on the switch Q15. When the switch Q15 is turned on, the voltage across the capacitor C4 decreases as the capacitor C4 discharges through the switch Q15. When the voltage across the capacitor C4 drops below V3, the comparator 518 outputs a digital 1, and the Q output of the SR flip-flop 520 is set to digital 0, which turns off the switch Q15. Then the capacitor C4 is charged by I2 again. As such, through the process described above, the pulse signal generator 504 can generate a pulse signal 536 which includes a series of pulses at the Q output of the SR flip-flop 520. The pulse signal 536 is sent to the S input of the SR flip-flop 522.

The trigger monitoring unit 506 is operable for monitoring an operation of the power switch 304 through the terminal CLK, and is operable for generating a driving signal for driving the counter 526 when an operation of the power switch 304 is detected at the terminal CLK. In one embodiment, when the power switch 304 is turned on, the voltage at the terminal CLK rises to a level that is equal to a voltage across the resistor R6 (shown in FIG. 4). When the power switch 304 is turned off, the voltage at the terminal CLK drops to zero. Therefore, a switch monitoring signal indicating the operation of the power switch 304 can be detected at the terminal CLK. In one embodiment, the trigger monitoring unit 506 generates a driving signal when a turn-off operation is detected at the terminal CLK.

The trigger monitoring unit 506 is further operable for controlling a conductance status of the switch Q27 through the terminal HV_GATE. When the power switch 304 is turned on, a breakdown voltage across the Zener diode ZD1 is applied to the switch Q27 through the resistor R3. Therefore, the switch Q27 can be turned on. The trigger monitoring unit 506 can turn off the switch Q27 by pulling the voltage at the terminal HV_GATE to zero. In one embodiment, the trigger monitoring unit 506 turns off the switch Q27 when a turn-off operation of the power switch 304 is detected at the terminal CLK and turns on the switch Q27 when a turn-on operation of the power switch 304 is detected at the terminal CLK.

In one embodiment, the dimmer 502 includes a counter 526 coupled to the trigger monitoring unit 506 for counting operations of the power switch 304, a digital-to-analog converter (D/A converter) 528 coupled to the counter 526. The dimmer 502 can further include a PWM generator 530 coupled to the D/A converter 528. The counter 526 can be driven by the driving signal generated by the trigger monitoring unit 506. More specifically, when the power switch 304 is turned off, the trigger monitoring unit 506 detects a negative edge of the voltage at the terminal CLK and generates a driving signal, in one embodiment. The counter value of the counter 526 can be increased, e.g., by 1, in response to the driving signal. The D/A converter 528 reads the counter value from the counter 526 and generates a dimming signal (e.g., control signal 538 or reference signal REF) based on the counter value. The dimming signal can be used to adjust a target power level of the power converter 310, which can in turn adjust the light output of the LED string 312.

In the burst dimming mode, the switch 540 is off, the switch 541 and the switch 542 are on. The inverting input of the comparator 534 receives a reference signal REF1 which can be a DC signal having a predetermined substantially constant voltage. The voltage of REF1 can determine a peak value of the LED current, which can in turn determine the maximum light output of the LED string 312. The dimming signal can be a control signal 538 which is applied to the PWM generator 530 for adjusting a duty cycle of the PWM signal PWM1. By adjusting the duty cycle of PWM1, the light output of the LED string 312 can be adjusted no greater than the maximum light output determined by REF1. For example, if PWM1 has a duty cycle of 100%, the LED string 312 can have the maximum light output. If the duty cycle of PWM1 is less than 100%, the LED string 312 can have a light output that is lower than the maximum light output.

In the analog dimming mode, the switch 540 is on, the switch 541 and the switch 542 are off, and the dimming signal can be an analog reference signal REF having an adjustable voltage. The D/A converter 528 can adjust the voltage of the reference signal REF according to the counter value of the counter 526. The voltage of REF can determine a peak value of the LED current, which can in turn determine an average value of the LED current. As such, the light output of the LED string 312 can be adjusted by adjusting the reference signal REF.

In one embodiment, the D/A converter 528 can decrease the voltage of REF in response to an increase of the counter value. For example, if the counter value is 0, the D/A converter 528 adjusts the reference signal REF to have a voltage V4. If the counter value is increased to 1 when a turn-off operation of the power switch 304 is detected at the terminal CLK by the trigger monitoring unit 506, the D/A converter 528 adjusts the reference signal REF to have a voltage V5 that is less than V4. Yet in another embodiment, the D/A converter 528 can increase the voltage of REF in response to an increase of the counter value.

In one embodiment, the counter value will be reset to zero after the counter 526 reaches its maximum counter value. For example, if the counter 526 is a 2-bit counter, the counter value will increase from 0 to 1, 2, 3 and then return to zero after four turn-off operations have been detected. Accordingly, the light output of the LED string 312 can be adjusted from a first level to a second level, then to a third level, then to a fourth level, and then back to the first level.

The inverting input of a comparator 534 can selectively receive the reference signal REF and the reference signal REF1. For example, the inverting input of the comparator 534 receives the reference signal REF through the switch 540 in the analog dimming mode, and receives the reference signal REF1 through the switch 541 in the burst dimming mode. The non-inverting input of the comparator 534 is coupled to the resistor R5 through the terminal MON for receiving a current monitoring signal SEN from the current sensing resistor R5. The voltage of the current monitoring signal SEN can indicate an LED current flowing through the LED string 312 when the switch Q27 and the control switch Q16 are turned on.

The output of the comparator 534 is coupled to the R input of the SR flip-flop 522. The Q output of the SR flip-flop 522 is coupled to an AND gate 524. The PWM signal PWM1 generated by the PWM generator 530 is applied to the AND gate 524. The AND gate 524 outputs a control signal to control the control switch Q16 through the terminal CTRL.

If the analog dimming mode is selected, the switch 540 is turned on and the switches 541 and 542 are turned off. The control switch Q16 is controlled by the SR flip-flop 522. In operation, when the power switch 304 is turned on, the breakdown voltage across the Zener diode ZD1 turns on the switch Q27. The SR flip-flop 522 generates a digital 1 at the Q output to turn on the control switch Q16 in response to the pulse signal 536 generated by the pulse generator 504. An LED current flowing through the inductor L1, the LED string 312, the switch Q27, the control switch Q16, the current sensing resistor R5 to ground. The LED current gradually increases because the inductor resists a sudden change of the LED current. As a result, the voltage across the current sensing resistor R5, that is, the voltage of the current monitoring signal SEN can be increased. When the voltage of SEN is greater than that of the reference signal REF, the comparator 534 generates a digital 1 at the R input of the SR flip-flop 522 so that the SR flip-flop 522 generates a digital 0 to turn off the control switch Q16. After the control switch Q16 is turned off, the inductor L1 is discharged to power the LED string 312. An LED current which flows through the inductor L1, the LED string 312 and the diode D4 gradually decreases. The control switch Q16 is turned on when the SR flip-flop 522 receives a pulse at the S input again, and then the LED current flows through the current sensing resistor R5 to ground again. When the voltage of the current monitoring signal SEN is greater than that of the reference signal REF, the control switch Q16 is turned off by the SR flip-flop 522. As described above, the reference signal REF determines a peak value of the LED current, which can in turn determine the light output of the LED string 312. By adjusting the reference signal REF, the light output of the LED string 312 can be adjusted.

In the analog dimming mode, when the power switch 304 is turned off, the capacitor C10 (shown in FIG. 4) is discharged to power the dimming controller 308. The counter value of the counter 526 can be increased by 1 when the trigger monitoring unit 506 detects a turn-off operation of the power switch 304 at the terminal CLK. The trigger monitoring unit 506 can turn off the switch Q27 in response to the turn-off operation of the power switch 304. The D/A converter 528 can adjust the voltage of the reference signal REF from a first level to a second level in response to the change of the counter value. Therefore, the light output of the LED string 312 can be adjusted in accordance with the adjusted reference signal REF when the power switch 304 is turned on.

If the burst dimming mode is selected, the switch 540 is turned off and the switches 541 and 542 are turned on. The inverting input of the comparator 534 receives a reference signal REF1 having a predetermined voltage. The control switch Q16 is controlled by both of the SR flip-flop 522 and the PWM signal PWM1 through the AND gate 524. The reference signal REF1 can determine a peak value of the LED current, which can in turn determine a maximum light output of the LED string 312. The duty cycle of the PWM signal PWM1 can determine the on/off time of the control switch Q16. When the PWM signal PWM1 is logic 1, the conductance status of the control switch Q16 is determined by the Q output of the SR flip-flop 522. When the PWM signal PWM1 is logic 0, the control switch Q16 is turned off. By adjusting the duty cycle of the PWM signal PWM1, the power of the LED string 312 can be adjusted accordingly. As such, the combination of the reference signal REF1 and the PWM signal PWM1 can determine the light output of the LED string 312.

In the burst dimming mode, when the power switch 304 is turned off, a turn-off operation of the power switch 304 can be detected by the trigger monitoring unit 506 at the terminal CLK. The trigger monitoring unit 506 turns off the switch Q27 and generates a driving signal. The counter value of the counter 526 can be increased, e.g., by 1, in response to the driving signal. The D/A converter 528 can generate the control signal 538 to adjust the duty cycle of the PWM signal PWM1 from a first level to a second level. Therefore, when the power switch 304 is turned on next time, the light output of the LED string 312 can be adjusted to follow a target light output which is determined by the reference signal REF1 and the PWM signal PWM1.

Figure 6:
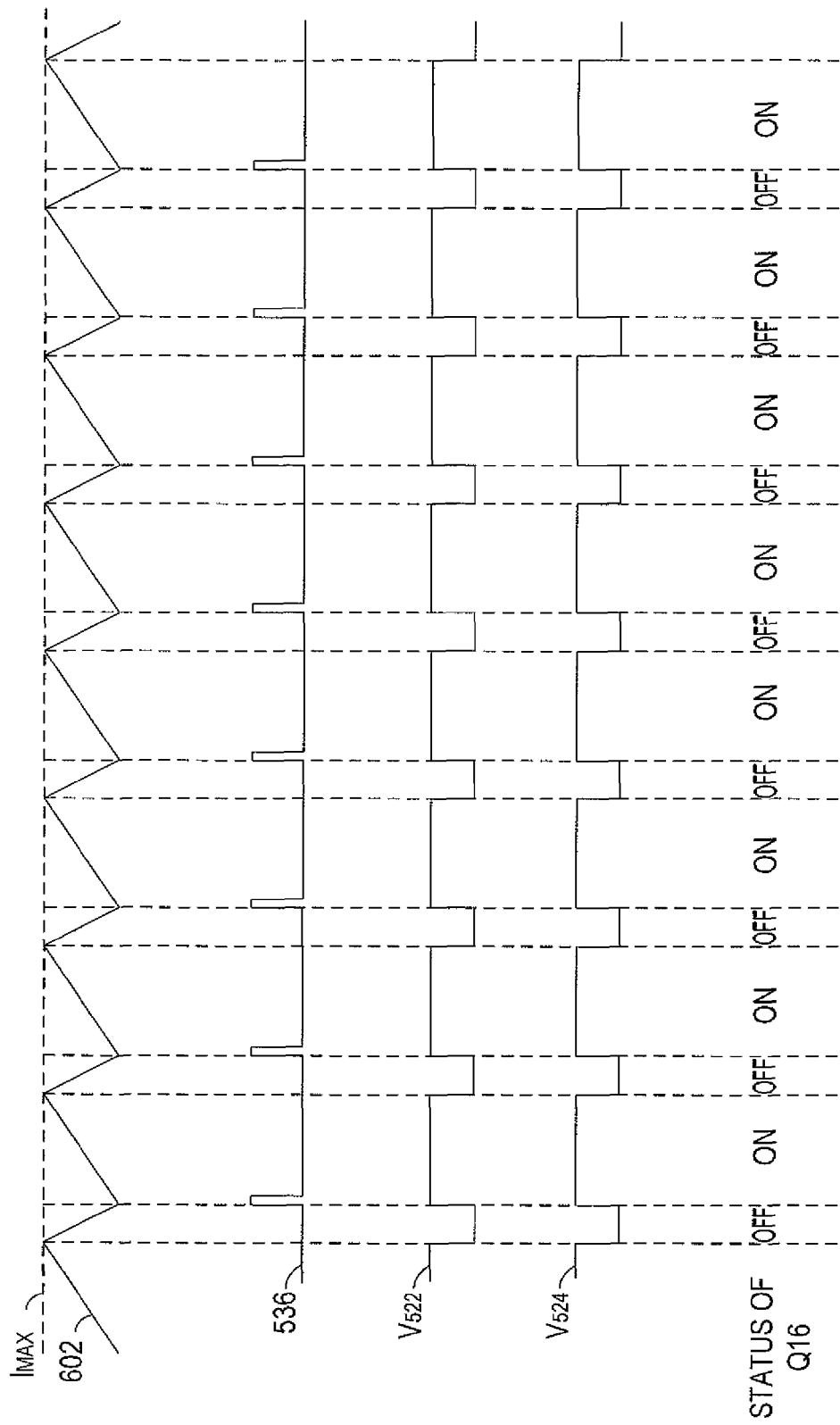
FIG. 6 illustrates signal waveforms in the analog dimming mode, in accordance with one embodiment of the present invention.

FIG. 6 illustrates examples of signal waveforms of an LED current 602 flowing through the LED string 312, the pulse signal 536, V522 which indicates the output of the SR flip-flop 522, V524 which indicates the output of the AND gate 524, and the ON/OFF status of the control switch Q16 in the analog dimming mode. FIG. 6 is described in combination with FIG. 4 and FIG. 5.

In operation, the pulse signal generator 504 generates pulse signal 536. The SR flip-flop 522 generates a digital 1 at the Q output in response to each pulse of the pulse signal 536. The control switch Q16 is turned on when the Q output of the SR flip-flop 522 is digital 1. When the control switch Q16 is turned on, the inductor L1 ramps up and the LED current 602 increases. When the LED current 602 reaches the peak value Imax, which means the voltage of the current monitoring signal SEN is substantially equal to the voltage of the reference signal REF, the comparator 534 generates a digital 1 at the R input of the SR flip-flop 522 so that the SR flip-flop 522 generates a digital 0 at the Q output. The control switch Q16 is turned off when the Q output of the SR flip-flop 522 is digital 0. When the control switch Q16 is turned off, the inductor L1 is discharged to power the LED string 312 and the LED current 602 decreases. In this analog dimming mode, by adjusting the reference signal REF, the average LED current can be adjusted accordingly and therefore the light output of the LED string 312 can be adjusted.

Figure 7:
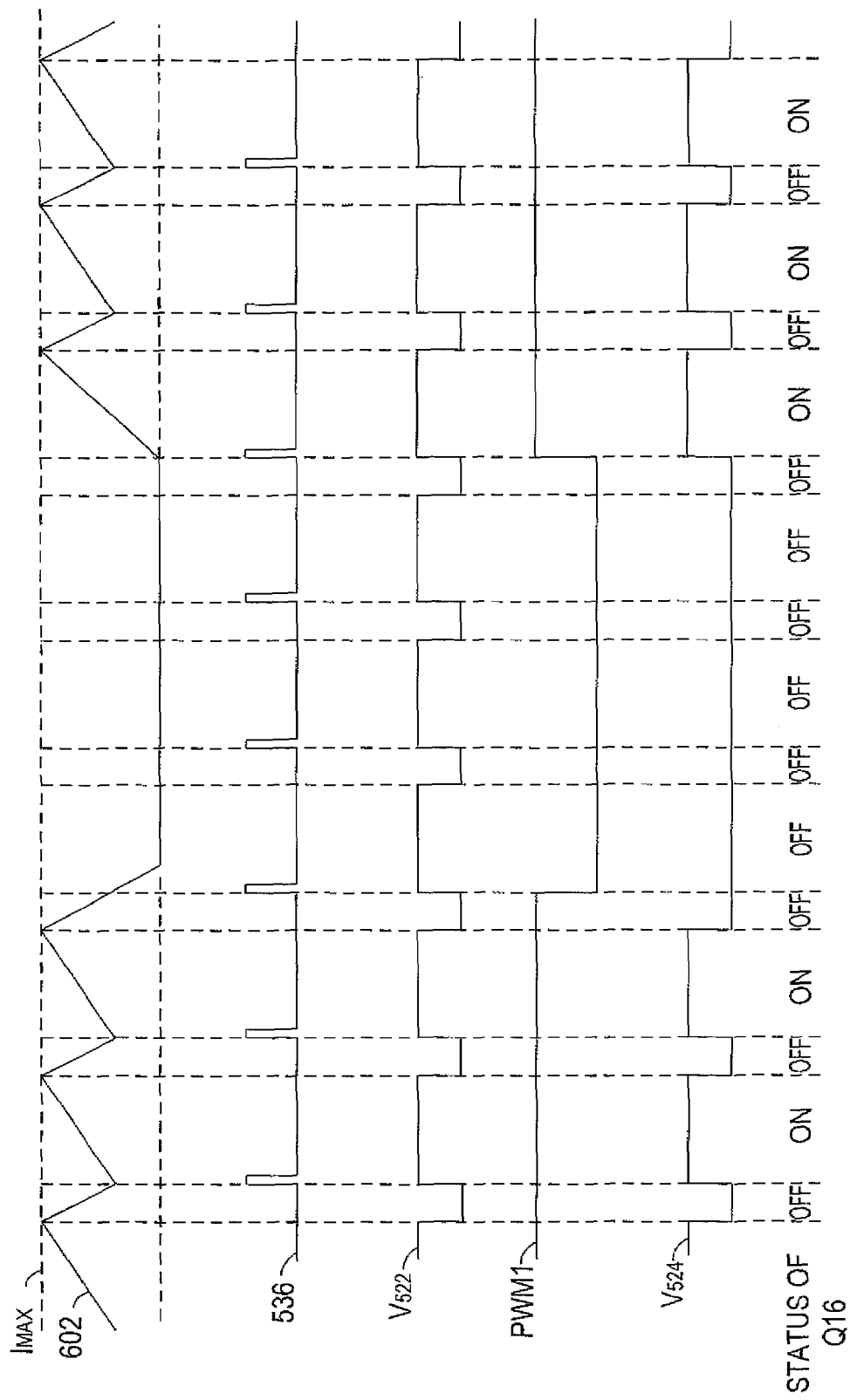
FIG. 7 illustrates signal waveforms in the burst dimming mode, in accordance with one embodiment of the present invention.

FIG. 7 illustrates examples of signal waveforms of the LED current 602 flowing through the LED string 312, the pulse signal 536, V522 which indicates the output of the SR flip-flop 522, V524 which indicates the output of the AND gate 524, and the ON/OFF status of the control switch Q16, and the PMW signal PWM1 in the burst dimming mode. FIG. 7 is described in combination with FIG. 4 and FIG. 5.

When PWM1 is digital 1, the relationship among the LED current 602, the pulse signal 536, V522, V524, and the ON/OFF status of the switch Q1 is similar to that is illustrated in FIG. 6. When PWM1 is digital 0, the output of the AND gate 524 turns to digital 0. Therefore, the control switch Q16 is turned off and the LED current 602 decreases. If the PWM1 holds digital 0 long enough, the LED current 602 can falls to zero. In this burst dimming mode, by adjusting the duty cycle of PWM1, the average LED current can be adjusted accordingly and therefore the light output of the LED string 312 can be adjusted.

Figure 8:
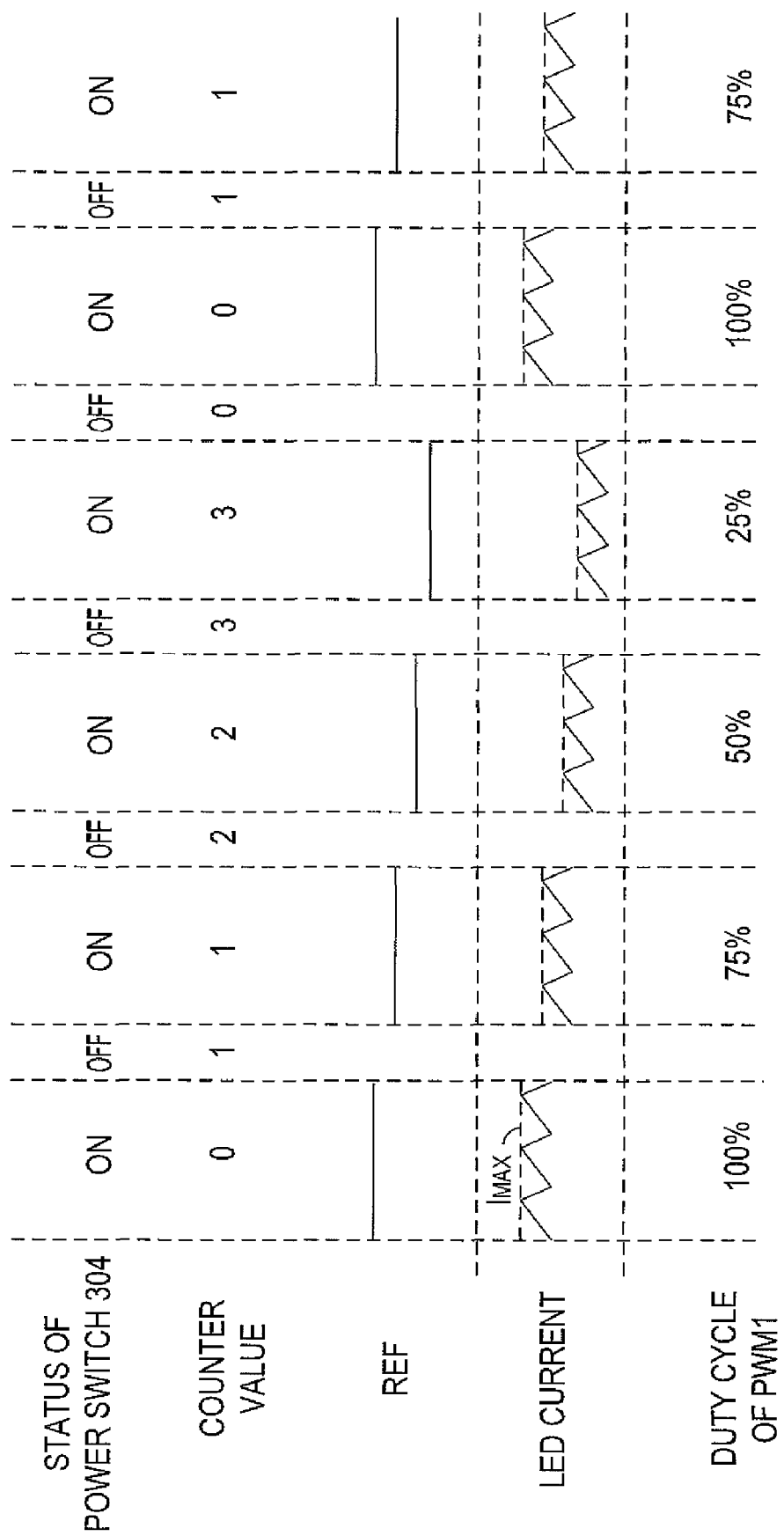
FIG. 8 illustrates a diagram illustrating an operation of a light source driving circuit which includes the dimming controller in FIG. 5, in accordance with one embodiment of the present invention.

FIG. 8 shows an example of a diagram illustrating an operation of a light source driving circuit which includes the dimming controller in FIG. 5, in accordance with one embodiment of the present invention. FIG. 8 is described in combination with FIG. 5.

In the example shown in FIG. 8, each time when a turn-off operation of the power switch 304 is detected by the trigger monitoring unit 506, the counter value of the counter 526 is increases by 1. The counter 526 can be a 2-bit counter which has a maximum counter value of 3.

In the analog dimming mode, the D/A converter 528 reads the counter value from the counter 526 and decreases the voltage of the reference signal REF in response to an increase of the counter value. The voltage of REF can determine a peak value Imax of the LED current, which can in turn determine an average value of the LED current. In the burst dimming mode, the D/A converter 528 reads the counter value from the counter 526 and decreases the duty cycle of the PWM signal PWM1 (e.g., decreases 25% each time) in response to an increase of the counter value. The counter 526 is reset after it reaches its maximum counter value (e.g., 3).

Figure 9:
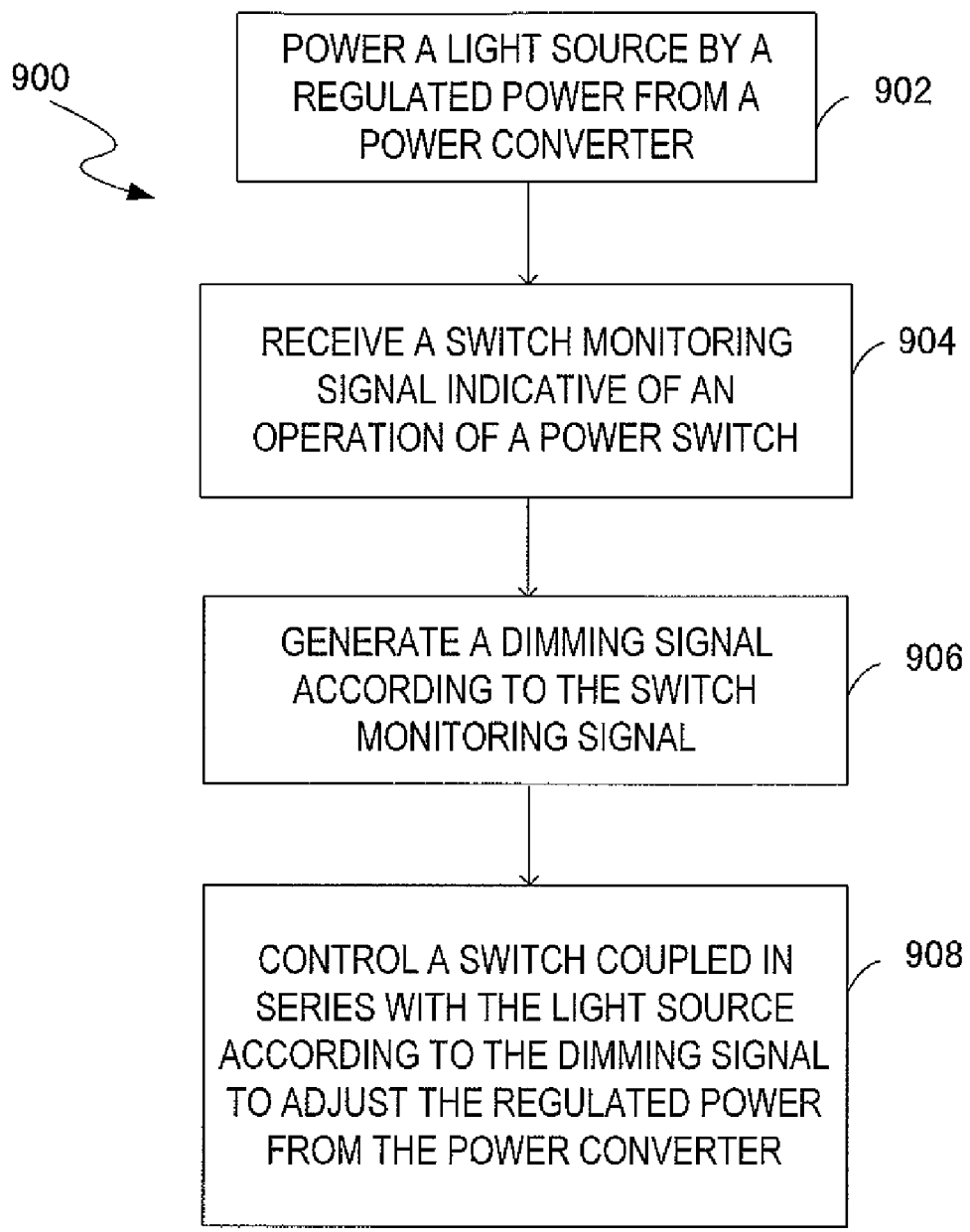
FIG. 9 shows a flowchart of a method for adjusting power of a light source, in accordance with one embodiment of the present invention.

FIG. 9 shows a flowchart 900 of a method for adjusting power of a light source, in accordance with one embodiment of the present invention. FIG. 9 is described in combination with FIG. 4 and FIG. 5.

In block 902, a light source, e.g., the LED string 312, is powered by a regulated power from a power converter, e.g., the power converter 310. In block 904, a switch monitoring signal can be received, e.g., by the dimming controller 308. The switch monitoring signal can indicate an operation of a power switch, e.g., the power switch 304 coupled between a power source and the power converter. In block 906, a dimming signal is generated according to the switch monitoring signal. In block 908, a switch coupled in series with the light source, e.g., the control switch Q16, is controlled according to the dimming signal so as to adjust the regulated power from the power converter. In one embodiment, in an analog dimming mode, the regulated power from the power converter can be adjusted by comparing the dimming signal with a feedback current monitoring signal which indicates a light source current of the light source. In another embodiment, in a burst dimming mode, the regulated power from the power converter can be adjusted by controlling a duty cycle of a PWM signal by the dimming signal.

Accordingly, embodiments in accordance with the present invention provide a light source driving circuit that can adjust power of a light source according to a switch monitoring signal indicative of an operation of a power switch, e.g., an on/off switch mounted on the wall. The power of the light source, which is provided by a power converter, can be adjusted by a dimming controller by controlling a switch coupled in series with the light source. Advantageously, as described above, users can adjust the light output of the light source through an operation (e.g., a turn-off operation) of a common on/off power switch. Therefore, extra apparatus for dimming, such as an external dimmer or a specially designed switch with adjusting buttons, can be avoided and the cost can be reduced.

Figure 10:
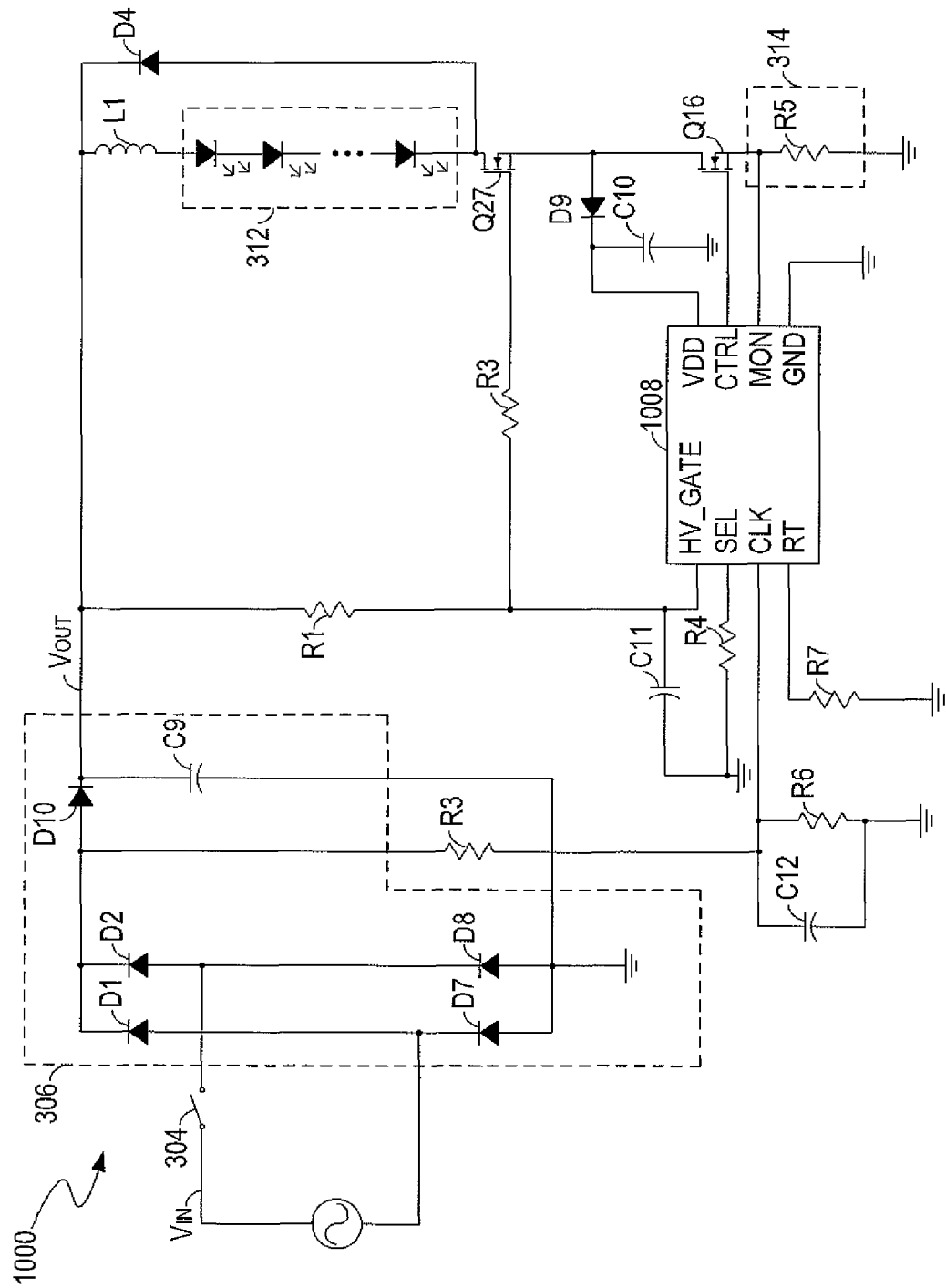
FIG. 10 shows a schematic diagram of a light source driving circuit, in accordance with one embodiment of the present invention.

FIG. 10 shows an example of a schematic diagram of a light source driving circuit 1000, in accordance with one embodiment of the present invention. FIG. 10 is described in combination with FIG. 3. Elements labeled the same as in FIG. 3 and FIG. 4 have similar functions.

The light source driving circuit 1000 includes a power converter 310 coupled to a power source and an LED string 312 for receiving power from the power source and for providing a regulated power to the LED string 312. A dimming controller 1008 is operable for monitoring a power switch 304 coupled between the power source and the light source driving circuit 1000 by monitoring the voltage at a terminal CLK. The dimming controller 1008 is operable for receiving a dimming request signal indicative of a first set of operations of the power switch 304 and for receiving a dimming termination signal indicative of a second set of operations of the power switch 304. The dimming controller 1008 can receive the dimming request signal and the dimming termination signal via the terminal CLK. The dimming controller 1008 is further operable for continuously adjusting the regulated power from the power converter 310 if the dimming request signal is received, and for stopping adjusting the regulated power from the power converter 310 if the dimming termination signal is received. In other words, the dimming controller 1008 can continuously adjust the power from the power converter 310 upon detection of the first set of operations of the power switch 304 until the second set of operations of the power switch 304 are detected. In one embodiment, the dimming controller 1008 can adjust the regulated power from the power converter 310 by controlling a control switch Q16 coupled in series with the LED string 312.

Figure 11:
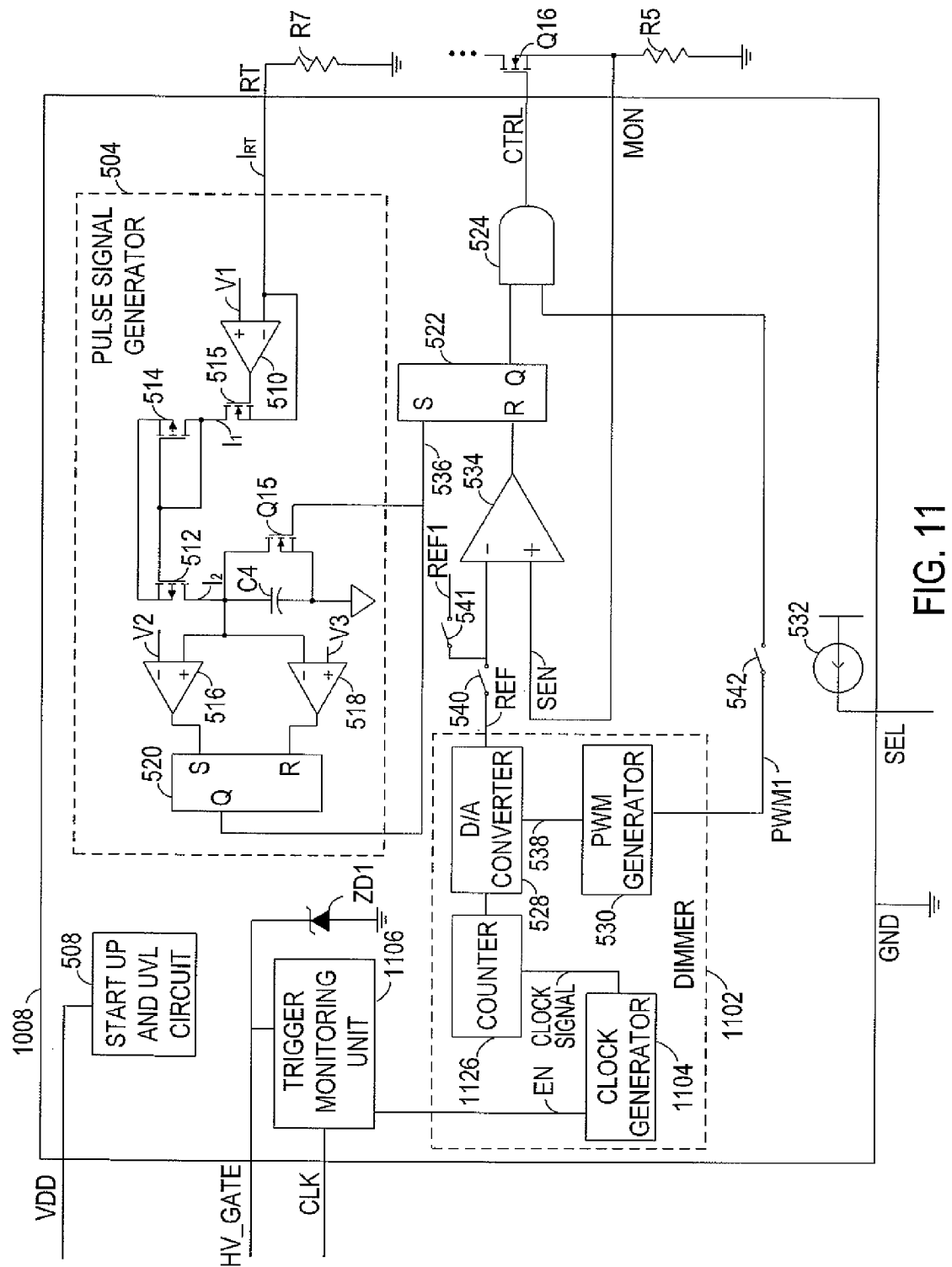
FIG. 11 shows a structure of a dimming controller in FIG. 10, in accordance with one embodiment of the present invention.

FIG. 11 shows an example of a structure of the dimming controller 1008 in FIG. 10, in accordance with one embodiment of the present invention. FIG. 11 is described in combination with FIG. 10. Elements labeled the same as in FIG. 4, FIG. 5 and FIG. 10 have similar functions.

In the example of FIG. 11, the structure of the dimming controller 1008 in FIG. 11 is similar to the structure of the dimming controller 308 in FIG. 5 except for the configuration of the dimmer 1102 and the trigger monitoring unit 1106. In FIG. 11, the trigger monitoring unit 1106 is operable for receiving the dimming request signal and the dimming termination signal via the terminal CLK, and for generating a signal EN to enable or disable a clock generator 1104. The trigger monitoring unit 1106 is further operable for controlling a conductance status of the switch Q27 coupled to the LED string 312.

The dimmer 1102 is operable for generating a reference signal REF to adjust power of the LED string 312 in an analog dimming mode, or generating a control signal 538 for adjusting a duty cycle of a PWM signal PWM1 to adjust the power of the LED string 312 in a burst dimming mode. In the example shown in FIG. 11, the dimmer 1102 can include the clock generator 1104 coupled to the trigger monitoring unit 1106 for generating a clock signal, a counter 1126 driven by the clock signal, a digital-to-analog (D/A) converter 528 coupled to the counter 1126. The dimmer 1102 can further include a PWM generator 530 coupled to the D/A converter 528.

In operation, when the power switch 304 is turned on or turned off, the trigger monitoring unit 1106 can detect a positive edge or a negative edge of the voltage at the terminal CLK. For example, when the power switch 304 is turned off, the capacitor C10 is discharged to power the dimming controller 1108. A voltage across the resistor R6 drops to zero. Therefore, a negative edge of the voltage at the terminal CLK can be detected by the trigger monitoring unit 1106. Similarly, when the power switch 304 is turned on, the voltage across the resistor R6 rises to a predetermined voltage. Therefore, a positive edge of the voltage at the terminal CLK can be detected by the trigger monitoring unit 1106. As such, operations, e.g., turn-on operations or turn-off operations, of the power switch 304 can be detected by the trigger monitoring unit 1106 by monitoring the voltage at the terminal CLK.

In one embodiment, a dimming request signal can be received by the trigger monitoring unit 1106 via the terminal CLK when a first set of operations of the power switch 304 are detected. A dimming termination signal can be received by the trigger monitoring unit 1106 via the terminal CLK when a second set of operations of the power switch 304 are detected. In one embodiment, the first set of operations of the power switch 304 includes a first turn-off operation followed by a first turn-on operation. In one embodiment, the second set of operations of the power switch 304 includes a second turn-off operation followed by a second turn-on operation.

If the dimming request signal is received by the trigger monitoring unit 1106, the dimming controller 1108 begins to continuously adjust the regulated power from the power converter 310. In an analog dimming mode, the dimming controller 1108 adjusts a voltage of a reference signal REF to adjust the regulated power from the power converter 310. In a burst dimming mode, the dimming controller 1108 adjusts a duty cycle of a PWM signal PWM1 to adjust the regulated power from the power converter 310.

If the dimming termination signal is received by the trigger monitoring unit 1106, the dimming controller 1108 can stop adjusting the regulated power from the power converter 310.

Figure 12:
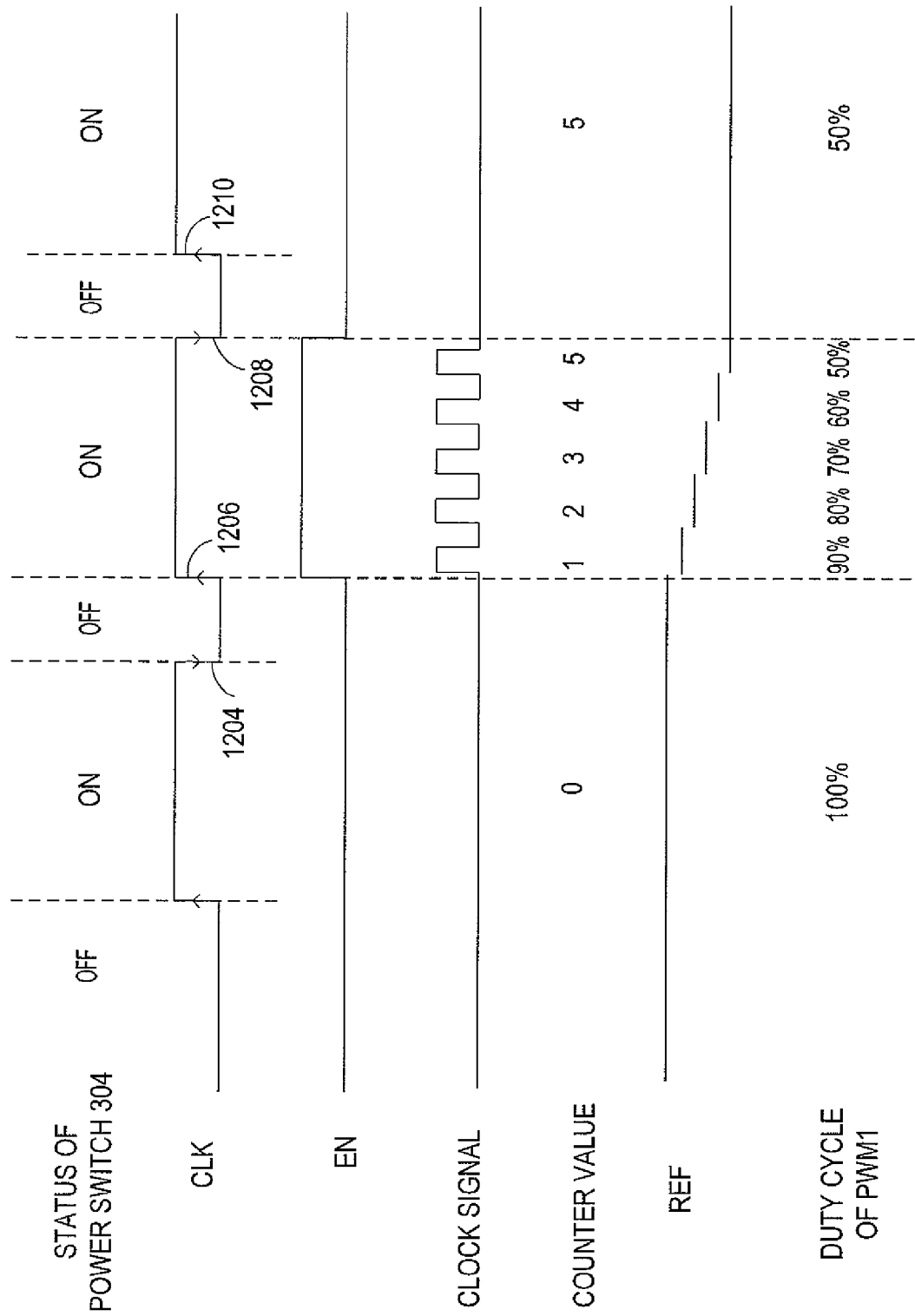
FIG. 12 illustrates a diagram illustrating an operation of a light source driving circuit which includes the dimming controller in FIG. 11, in accordance with one embodiment of the present invention.

FIG. 12 illustrates an example of a diagram illustrating an operation of a light source driving circuit which includes the dimming controller 1008 in FIG. 11, in accordance with one embodiment of the present invention. FIG. 12 is described in combination with FIG. 10 and FIG. 11.

Assume that initially the power switch 304 is off. In operation, when the power switch 304 is turned on, e.g., by a user, the LED string 312 is powered by a regulated power from the power converter 310 to generate an initial light output, in one embodiment. In the analog dimming mode, the initial light output can be determined by an initial voltage of the reference signal REF. In the burst dimming mode, the initial light output can be determined by an initial duty cycle (e.g., 100%) of the PWM signal PWM1. The reference signal REF and the PWM signal PWM1 can be generated by the D/A converter 528 according to a counter value of the counter 1126, in one embodiment. Therefore, the initial voltage of REF and the initial duty cycle of PWM1 can be determined by an initial counter value (e.g., zero) provided by the counter 1126.

In order to adjust the light output of the LED string 312, the user can apply a first set of operations to the power switch 304. A dimming request signal is generated upon detection of the first set of operations of the power switch 304. In one embodiment, the first set of operations can include a first turn-off operation followed by a first turn-on operation. As a result, a dimming request signal including a negative edge 1204 followed by a positive edge 1206 of the voltage at the terminal CLK can be detected and received by the trigger monitoring unit 1106. In response to the dimming request signal, the trigger monitoring unit 1106 can generate a signal EN having a high level. Thus, the clock generator 1104 is enabled to generate a clock signal. The counter 1126 driven by the clock signal can change the counter value in response to each clock pulse of the clock signal. In the example of FIG. 12, the counter value increases in response to the clock signal. In one embodiment, the counter value can be reset to zero after the counter 1126 reaches its predetermined maximum counter value. In another embodiment, the counter value increases until the counter 1126 reaches its predetermined maximum counter value, and then decreases until the counter 1126 reaches its predetermined minimum counter value.

In the analog dimming mode, the D/A converter 528 reads the counter value from the counter 1126 and decreases the voltage of the reference signal REF in response to an increase of the counter value, in one embodiment. In the burst dimming mode, the D/A converter 528 reads the counter value from the counter 1126 and decreases the duty cycle of the PWM signal PWM1 (e.g., decreases 10% each time) in response to an increase of the counter value, in one embodiment. Accordingly, the light output of the LED string 312 can be adjusted because the regulated power from the power converter 310 can be determined by the voltage of the reference signal REF (in the analog dimming mode) or by the duty cycle of the PWM signal PWM1 (in the burst dimming mode).

Once a desired light output has been achieved, the user can terminate the adjustment process by applying a second set of operations to the power switch 304. A dimming termination signal is generated upon detection of the second set of operations of the power switch 304. In one embodiment, the second set of operations can include a second turn-off operation followed by a second turn-on operation. As a result, the dimming termination signal including a negative edge 1208 followed by a positive edge 1210 of the voltage at the terminal CLK can be detected and received by the trigger monitoring unit 1106. Upon detection of the dimming termination signal, the trigger monitoring unit 1106 can generate the signal EN having a low level. Thus, the clock generator 1104 is disabled, such that the counter 1126 can hold its counter value. Accordingly, in the analog dimming mode, the voltage of the reference signal REF can be held at a desired level. In the burst dimming mode, the duty cycle of the PWM signal PWM1 can be held at a desired value. Therefore, the light output of the LED string 312 can be maintained at a desired light output.

Figure 13:
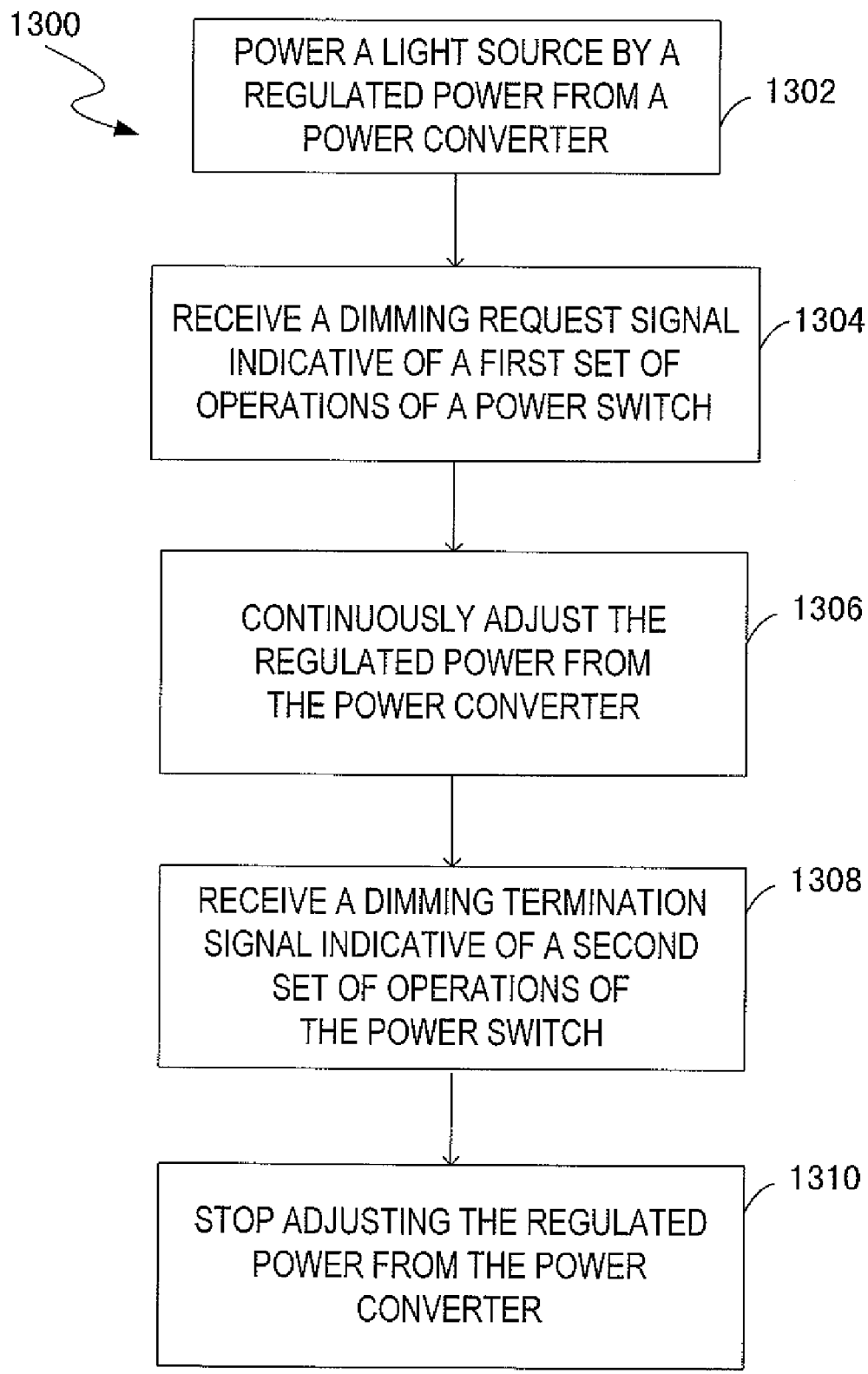
FIG. 13 shows a flowchart of a method for adjusting power of a light source, in accordance with one embodiment of the present invention.

FIG. 13 shows a flowchart 1300 of a method for adjusting power of a light source, in accordance with one embodiment of the present invention. FIG. 13 is described in combination with FIG. 10 and FIG. 11.

In block 1302, a light source, e.g., the LED string 312, is powered by a regulated power from a power converter, e.g., the power converter 310.

In block 1304, a dimming request signal can be received, e.g., by the dimming controller 1108. The dimming request signal can indicate a first set of operations of a power switch, e.g., the power switch 304 coupled between a power source and the power converter. In one embodiment, the first set of operations of the power switch includes a first turn-off operation followed by a first turn-on operation.

In block 1306, the regulated power from the power converter is continuously adjusted, e.g., by the dimming controller 1108. In one embodiment, a clock generator 1104 can be enabled to drive a counter 1126. A dimming signal (e.g., control signal 538 or reference signal REF) can be generated according to the counter value of the counter 1126. In an analog dimming mode, the regulated power from the power converter can be adjusted by comparing the reference signal REF with a feedback current monitoring signal which indicates a light source current of the light source. The voltage of REF can be determined by the counter value. In a burst dimming mode, the regulated power from the power converter can be adjusted by varying a duty cycle of a PWM signal PWM1 by the control signal 538. The duty cycle of PWM1 can be also determined by the counter value.

In block 1308, a dimming termination signal can be received, e.g., by the dimming controller 1108. The dimming termination signal can indicate a second set of operations of a power switch, e.g., the power switch 304 coupled between a power source and the power converter. In one embodiment, the second set of operations of the power switch includes a second turn-off operation followed by a second turn-on operation.

In block 1310, the adjustment of the regulated power from the power converter is terminated if the dimming termination signal is received. In one embodiment, the clock generator 1104 is disabled such that the counter 1126 can hold its counter value. As a result, in the analog dimming mode, the voltage of REF can be held at a desired level. In the burst dimming mode, the duty cycle of the PWM signal PWM1 can be held at a desired value. Consequently, the light source can maintain a desired light output.

Accordingly, embodiments in accordance with the present invention provide a light source driving circuit that can automatically and continuously adjust power of a light source if a dimming request signal is received. The light source driving circuit can stop adjusting power of the light source if a dimming termination signal is received. Advantageously, a user can enable a light/brightness adjustment by applying a first set of operations to a power switch, e.g., an on/off switch mounted on the wall. During the light adjustment process, the light output of the light source gradually decreases or increases. If a desired light output has been achieved, the user can terminate the light adjustment by applying a second set of operations to the power switch. Therefore, extra apparatus for dimming, such as an external dimmer or a specially designed switch with adjusting buttons, can be avoided and the cost can be reduced.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A dimming controller for controlling dimming of a light emitting diode (LED) light source, said dimming controller comprising:
 a terminal for receiving a dimming request signal indicative of a first plurality of operations of a power switch, and for receiving a dimming termination signal indicative of a second plurality of operations of said power switch, wherein said power switch transfers power from an AC power source to a bridge rectifier when said power switch is on, and wherein a power converter receives input power from said bridge rectifier and provides output power to said LED light source,
 wherein said dimming controller adjusts said output power by controlling a control switch in series with said LED light source if said dimming request signal is received and until said dimming termination signal is received, and wherein said first plurality of operations of said power switch comprises a first turn-off operation followed by a first turn-on operation, and wherein said second plurality of operations of said power switch comprises a second turn-off operation followed by a second turn-on operation.

2. The dimming controller of claim 1, further comprising:
 a trigger monitoring unit for receiving said dimming request signal and said dimming termination signal; and
 a dimmer coupled to said trigger monitoring unit and for generating a dimming signal to adjust a target power level of said power converter coupled to said dimming controller.

3. The dimming controller of claim 2, wherein said dimmer comprises:
 a clock generator for generating a clock signal;
 a counter coupled to said clock generator and driven by said clock signal; and
 a digital-to-analog converter coupled to said counter and for generating said dimming signal based on a counter value of said counter,
 wherein said trigger monitoring unit enables said clock generator to drive said counter when said dimming request signal is received by said trigger monitoring unit, and disables said clock generator from driving said counter when said dimming termination signal is received by said trigger monitoring unit.

4. The dimming controller of claim 2, wherein said dimming controller operates in a burst dimming mode in which a pulse width modulation signal is generated based on said dimming signal, wherein a duty cycle of said pulse width modulation signal is determined by said dimming signal, and wherein said pulse width modulation signal controls said control switch.

5. The dimming controller of claim 2, wherein said dimming controller operates in an analog dimming mode in which a comparator compares said dimming signal with a current monitoring signal indicating an LED current flowing through said LED light source and generates a control signal to control said control switch.

6. A system comprising:
 a power converter coupled to a power source and a light emitting diode (LED) light source and for receiving power from said power source, and for providing output power to said LED light source; and
 a dimming controller coupled to said power converter and for monitoring a power switch coupled to said power source, and for continuously adjusting said power from said power converter upon detection of a first plurality of operations of said power switch until a second plurality of operations of said power switch are detected, said dimming controller comprising:
 a clock generator for generating a clock signal upon detection of said first plurality of operations of said power switch; and
 a counter driven by said clock signal for providing a counter value to adjust said output power from said power converter.

7. The system of claim 6, wherein said power converter comprises:
 a control switch coupled in series with said LED light source,
 wherein said dimming controller is coupled to said control switch and adjusts said output power from said power converter by controlling said control switch.

8. The system of claim 6, further comprising:
 an AC/DC converter for converting an AC power from said power source to a DC power,
 wherein said power switch is coupled between said power source and said AC/DC converter.

9. The system of claim 6, wherein said first plurality of operations of said power switch comprises a first turn-off operation followed by a first turn-on operation, and wherein said second plurality of operations of said power switch comprises a second turn-off operation followed by a second turn-on operation.

10. The system of claim 6, wherein said power converter comprises an inductor coupled in series with said LED light source.

11. The system of claim 6, further comprising:
 an energy storage unit coupled to said dimming controller and for powering said dimming controller when said power switch is turned off.

12. The system of claim 6, wherein said dimming controller comprises:
 a trigger monitoring unit for detecting said first plurality of operations of said power switch and said second plurality of operations of said power switch; and
 a dimmer coupled to said trigger monitoring unit and for generating a dimming signal to adjust a target power level of said power converter based on said counter value.

13. The system of claim 12, wherein said dimmer comprises:
 a digital-to-analog converter coupled to said counter and for generating said dimming signal based on said counter value.

14. The system of claim 12, wherein said dimming controller operates in a burst dimming mode in which a pulse width modulation signal is generated based on said dimming signal, wherein a duty cycle of said pulse width modulation signal is determined by said dimming signal, and wherein said pulse width modulation signal controls a control switch coupled in series with said LED light source.

15. The system of claim 12, wherein said dimming controller operates in an analog dimming mode in which a comparator compares said dimming signal with a current monitoring signal indicating an LED current flowing through said light source and generates a control signal to control a control switch coupled in series with said LED light source.

16. A method for controlling dimming of a light emitting diode (LED) light source, said method comprising:
   powering said LED light source based on output power from a power converter;
   receiving a dimming request signal indicative of a first plurality of operations of a power switch coupled between a power source and said power converter; and
   adjusting said output power from said power converter in response to said dimming request signal until a dimming termination signal indicative of a second plurality of operations of said power switch is received,
   wherein adjusting said output power further comprises:
      driving a counter based on a clock signal;
      generating a dimming signal based on a counter value of said counter; and
      controlling a control switch coupled in series with said LED light source based on said dimming signal to adjust said output power.

17. The method of claim 16, wherein said first plurality of operations of said power switch comprises a first turn-off operation followed by a first turn-on operation, and wherein said second plurality of operations of said power switch comprises a second turn-off operation followed by a second turn-on operation.

18. The method of claim 16, further comprising:
   disabling said clock signal if said dimming termination signal is received.

* * * * *